United States Patent
Diehl

(10) Patent No.: US 11,604,846 B1
(45) Date of Patent: Mar. 14, 2023

(54) COMPUTER-BASED SYSTEM FOR PROFILE MATCHING

(71) Applicant: James Diehl, Marietta, OH (US)

(72) Inventor: James Diehl, Marietta, OH (US)

(*) Notice: Subject to any disclaimer, the term of this patent is extended or adjusted under 35 U.S.C. 154(b) by 0 days.

(21) Appl. No.: 17/590,355

(22) Filed: Feb. 1, 2022

Related U.S. Application Data

(60) Provisional application No. 63/233,806, filed on Aug. 17, 2021.

(51) Int. Cl.
*G06F 16/9535* (2019.01)

(52) U.S. Cl.
CPC ................................ *G06F 16/9535* (2019.01)

(58) Field of Classification Search
CPC ............. G06F 16/9535; G06F 16/9536; G06F 16/9538
See application file for complete search history.

(56) References Cited

U.S. PATENT DOCUMENTS

| | | | |
|---|---|---|---|
| 6,272,467 B1* | 8/2001 | Durand | G06Q 10/02 705/26.1 |
| 8,195,673 B2 | 6/2012 | Wilf | |
| 9,733,811 B2 | 8/2017 | Rad et al. | |
| 2006/0059130 A1* | 3/2006 | Weiss | G06F 16/951 |
| 2008/0140681 A1 | 6/2008 | Ajibade | |
| 2011/0082885 A1 | 4/2011 | Wilf | |
| 2014/0074824 A1 | 3/2014 | Rad et al. | |
| 2016/0292764 A1* | 10/2016 | Kravets | G06Q 30/0633 |
| 2018/0025440 A1* | 1/2018 | Wheeler | G06F 16/24 705/319 |

* cited by examiner

*Primary Examiner* — Kris E Mackes
(74) *Attorney, Agent, or Firm* — The Law Office of Patrick F. O'Reilly III, LLC

(57) ABSTRACT

A computer-based system for profile matching is disclosed herein. The computer-based system includes an interface and a processor coupled to the interface. The interface is operable to receive a matching request, and the processor is operable to determine whether all locked user preferences of a first system user are met by a second system user in response to receiving the matching request; determine whether all locked user preferences of the second system user are met by the first system user in response to receiving the matching request; and, when at least all locked user preferences of the first system user are met by the second system user and all locked user preferences of the second system user are met by the first system user, display profile information regarding the second system user to the first system user so that the first system user can communicate with the second system user.

14 Claims, 10 Drawing Sheets

MY PROFILE

ITEM 11. / SMOKING - ON A DAILY BASIS

1. NO
2. SOME
3. YES

Once all 24 + MY PROFILE items are complete the User will now select toggles under the 24 + MY CHOICES items.

211

1. ANYTHING
2. LESS THAN $25,000
3. $25,000 TO $50,000
4. $50,000 TO $75,000
5. $75,000 TO $100,000
6. GREATER THAN $100,00

217

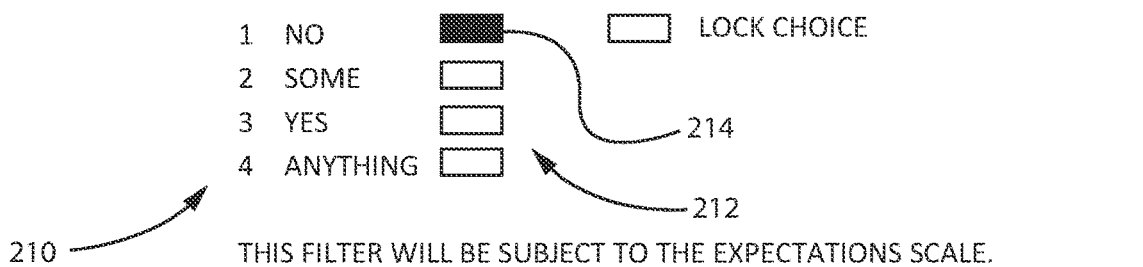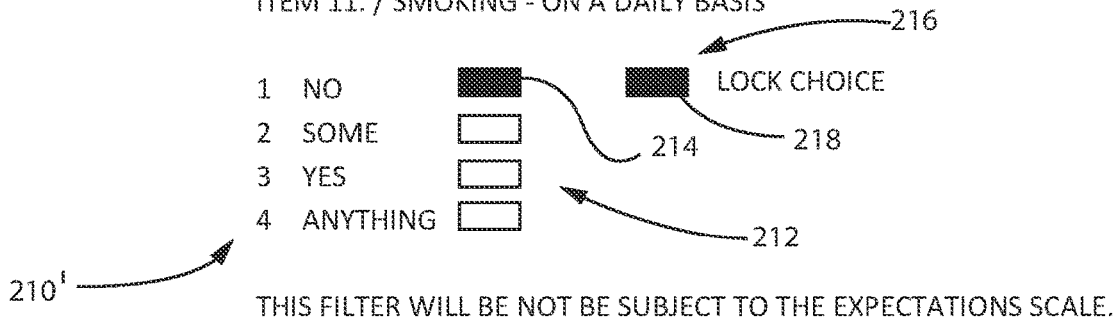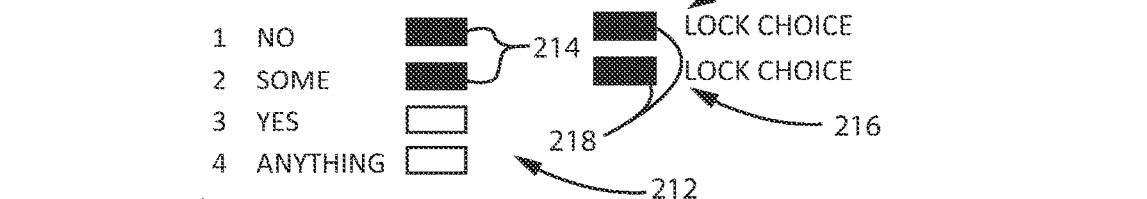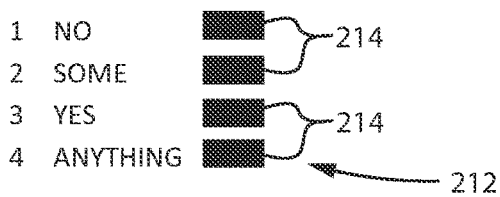
FIG. 9

A sliding scale for all non-locked choices. Note: all Locked choices must still be met.

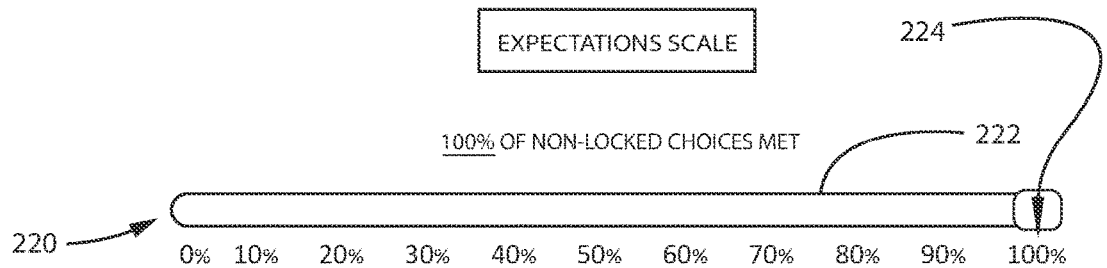

All non-locked choices met. If there were 10 non-locked choices all 10 must be met.

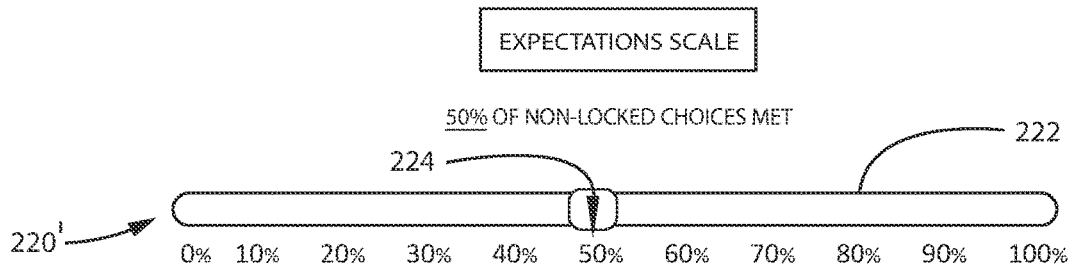

Only some of the non-locked choices must be met. If there were 10 non-locked choices at least 50% or 5 of the 10 choices are required to be met.

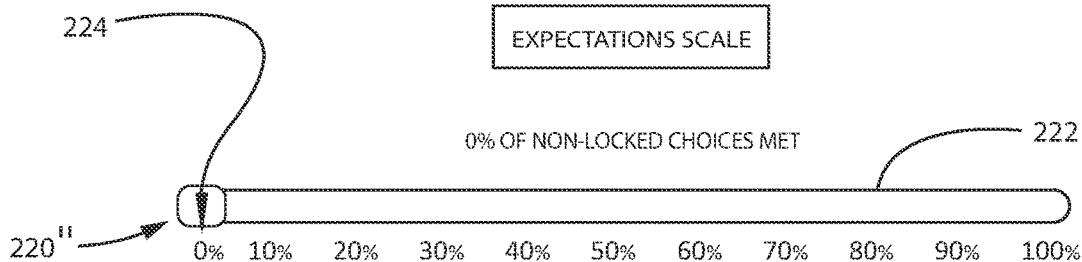

At Zero percent none of the non-locked choices must be met. If there were 10 non-locked choices none of them are required to be met.

As the number of USERs grows the expectations scale will be helpful in limiting the quantity of matches to users that meet a majority, but not all the USERs' non-locked My Choices

FIG. 10

COMPUTER-BASED SYSTEM FOR PROFILE MATCHING

CROSS-REFERENCE TO RELATED APPLICATIONS

This patent application claims priority to, and incorporates by reference in its entirety, U.S. Provisional Patent Application No. 63/233,806, entitled "My Choice", filed on Aug. 17, 2021.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL IN APPENDIX

A copy of exemplary selection choices for the user profile items 202 in FIG. 5 described herein are attached as Appendix A to this specification. A copy of exemplary selection choices for the user preference items 203 in FIG. 6 described herein are attached as Appendix B to this specification. The contents of these exemplary selection choices for the user profile items 202 and the user preference items 203 included in Appendices A and B, respectively, are hereby incorporated by reference in their entireties herein.

BACKGROUND OF THE INVENTION

1. Field of the Invention

The invention generally relates to a computer-based system for profile matching. More particularly, the invention relates to a computer-based system for profile matching that enables users of the system to have substantial control over the matching process.

2. Background

Social networking platforms have become a common way for people to establish new relationships or friendships. For example, online dating applications are increasingly common to find a lifelong partner or friendships. However, some applications may lack the means to properly sort through different wants and needs in a partner. A small standard profile is often created with just a few lines of text to describe a person. This may be ineffective at identifying a proper match.

In addition, conventional online dating applications have limited user-applied filters. As such, these filters are often ineffective in adequately narrowing the search results obtained by a particular user. This problem leads to a large saturation of a large number of matches, where the matches are frequently the result of one system user simply liking the picture of another system user. The large number of matches that must be manually sorted through by a user often leads to dating fatigue as a result of the vast number of hours spent on the online dating application with few, if any, compatible matches. In some cases, the tremendous amount of time spent on the online dating applications without success may also lead to a psychological perception by the user that there is no one desirable to be found on the online dating application. Such dating fatigue often results in the discouragement of the user, and sometimes complete abandonment of whole online dating process altogether.

Moreover, conventional online dating applications do not take into account the preferences of the users that are being searched. This limitation often leads to the preferences of user performing the search being met, but not the preferences of the matching users being met by the user performing the search. In such a case, a relationship or desire fails quickly when only the preferences of one side are being met. Also, the user performing the search can develop a psychological perception that individuals that he or she desires on the online dating application do not want him or her.

Furthermore, many conventional online dating applications are full of fake user profiles and/or spammers. The presence of these fake user profiles and/or spammers may lead to a psychological perception of the users that the online dating applications contain nothing but fake user profiles and insincere users.

Therefore, what is needed is a computer-based system for profile matching that provides system users with substantial control over the individuals with whom they are matched. Moreover, a computer-based system for profile matching is needed that takes into account the two-way compatibility of users in order to substantially increase the efficiency and effectiveness of the matching process. Furthermore, there is a need for a computer-based system for profile matching that facilitates the identification of fake user profiles and/or spammers by a system user.

BRIEF SUMMARY OF EMBODIMENTS OF THE INVENTION

Accordingly, the present invention is directed to a computer-based system for profile matching that substantially obviates one or more problems resulting from the limitations and deficiencies of the related art.

In accordance with one or more embodiments of the present invention, there is provided a computer-based system for profile matching that includes an interface and a processor coupled to the interface. The interface that is operable to: (i) electronically receive a plurality of user profiles associated with a social networking platform, a first one of the user profiles comprising user preferences of a first system user, a second one of the user profiles comprising user preferences of a second system user, and a third one of the user profiles comprising user preferences of a third system user, at least some of the user preferences of the first, second, and third system users being lockable so as to require that any locked user preference be met during a matching request; and (ii) electronically receive a first matching request, the first matching request electronically submitted by the first system user using a first electronic device. The processor is operable to: (i) determine whether all locked user preferences of the first system user are met by the second system user in response to receiving the first matching request; (ii) determine whether all locked user preferences of the second system user are met by the first system user in response to receiving the first matching request; (iii) when at least all locked user preferences of the first system user are met by the second system user and all locked user preferences of the second system user are met by the first system user, display profile information regarding the second system user to the first system user so that the first system user is able to initiate communication with the second system user; (iv) determine whether all locked user preferences of the first system user are met by the third system user in response to receiving the first matching request; (v) determine whether all locked user preferences of the third system user are met by the first system user in response to receiving the first matching request; and (vi) when all locked user preferences of the first system user are not met by the third system user and/or all locked user preferences of the third system user are not met by the first system user, do not display profile information regarding the third system user to the first system user.

In a further embodiment of the present invention, the first electronic device comprises a graphical user interface, and the processor is further operable to generate an expectations scale on the graphical user interface of the first electronic device so that the first system user is able to select a percentage of non-locked user preferences that are required to be met during a matching request; and the interface is further operable to electronically receive the percentage of non-locked user preferences electronically submitted by the first system user using the first electronic device. In response to receiving the percentage of non-locked user preferences, the processor is further operable to: (i) prior to displaying the profile information regarding the second system user to the first system user, further determine whether the percentage of non-locked user preferences of the first system user are met by the second system user and whether the percentage of non-locked user preferences of the second system user are met by the first system user, in addition to all locked user preferences of the first system user being met by the second system user and all locked user preferences of the second system user being met by the first system user; (ii) when the percentage of non-locked user preferences of the first system user additionally are met by the second system user and the percentage of non-locked user preferences of the second system user additionally are met by the first system user, display the profile information regarding the second system user to the first system user so that the first system user is able to initiate communication with the second system user; and (iii) when the percentage of non-locked user preferences of the first system user are not met by the second system user and/or the percentage of non-locked user preferences of the second system user are not met by the first system user, do not display profile information regarding the second system user to the first system user.

In yet a further embodiment, the processor is further operable to: (i) determine a quantity of times that a user profile of a particular system user has been changed by the particular system user within a predetermined period of days; and (ii) when displaying the profile information regarding the particular system user to another system user, the profile information of the particular system user includes the quantity of times that the user profile has been changed by the particular system user within the predetermined period of days so as to assist the other system user in determining whether to communicate with the particular system user.

In still a further embodiment, the processor is further operable to: (i) determine a quantity of times that one or more user preferences of a particular system user have been changed by the particular system user within a predetermined period of days; and (ii) when displaying the profile information regarding the particular system user to another system user, the profile information of the particular system user includes the quantity of times that the one or more user preferences have been changed by the particular system user within the predetermined period of days so as to assist the other system user in determining whether to communicate with the particular system user.

In yet a further embodiment, the social networking platform comprises an online dating platform, and the user preferences of the first system user and the second system user are selected from the group consisting of: (i) age, (ii) gender, (iii) height, (iv) weight, (v) body type, (vi) eye color, (vii) hair, (viii) education, (ix) occupation, (x) income, (xi) smoking status, (xii) drug use, (xiii) alcohol use, (xiv) relationship information, (xv) marital status, (xvi) children, (xvii) sports, (xviii) pet information, (xix) type of car, (xx) ethnicity, (xxi) religion, (xxii) ambition, (xxiii) personality, (xxiv) intent, and (xxv) combinations thereof.

In still a further embodiment, all of the user preferences of the first, second, and third system users are lockable so as to require that any locked user preference be met during a matching request.

In yet a further embodiment, the first electronic device comprises a graphical user interface, and the processor is further operable to display a photograph of the second system user to the first system user as part of the profile information on the graphical user interface of the first electronic device after determining that at least all locked user preferences of the first system user are met by the second system user and all locked user preferences of the second system user are met by the first system user.

In still a further embodiment, the interface is operable to electronically receive a second matching request, the second matching request electronically submitted by the second system user using a second electronic device; and the processor is further operable to, when at least all locked user preferences of the second system user are met by the first system user and all locked user preferences of the first system user are met by the second system user, display profile information regarding the first system user to the second system user so that the second system user is able to initiate communication with the first system user.

In yet a further embodiment, the second electronic device comprises a graphical user interface, and the processor is further operable to display a photograph of the first system user to the second system user as part of the profile information on the graphical user interface of the second electronic device after determining that at least all locked user preferences of the second system user are met by the first system user and all locked user preferences of the first system user are met by the second system user.

In still a further embodiment, the second electronic device comprises a graphical user interface, and the processor is further operable to generate an expectations scale on the graphical user interface of the second electronic device so that the second system user is able to select a percentage of non-locked user preferences that are required to be met during a matching request; and the interface is further operable to electronically receive the percentage of non-locked user preferences electronically submitted by the second system user using the second electronic device. In response to receiving the percentage of non-locked user preferences, the processor is further operable to: (i) prior to displaying the profile information regarding the first system user to the second system user, further determine whether the percentage of non-locked user preferences of the second system user are met by the first system user and whether the percentage of non-locked user preferences of the first system user are met by the second system user, in addition to all locked user preferences of the second system user being met by the first system user and all locked user preferences of the first system user being met by the second system user; (ii)

when the percentage of non-locked user preferences of the second system user additionally are met by the first system user and the percentage of non-locked user preferences of the first system user additionally are met by the second system user, display the profile information regarding the first system user to the second system user so that the second system user is able to initiate communication with the first system user; and (iii) when the percentage of non-locked user preferences of the second system user are not met by the first system user and/or the percentage of non-locked user preferences of the first system user are not met by the second system user, do not display profile information regarding the first system user to the second system user.

In yet a further embodiment, the interface is further operable to electronically receive a third matching request, the third matching request electronically submitted by the third system user using a third electronic device; and the processor is further operable to, when all locked user preferences of the third system user are not met by the first system user and/or all locked user preferences of the first system user are not met by the third system user, do not display profile information regarding the first system user to the third system user.

In still a further embodiment, at least one user preference of the first system user that is electronically received by the interface comprises a plurality of locked choices; and the processor is further operable to determine that all locked user preferences of the first system user are met by the second system user when at least one of the plurality of locked choices for the at least one user preference of the first system user is met by the second system user.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which:

FIG. 9 depicts diagrammatic illustrations of several different examples of a user preference item screen of the computer-based system for profile matching, according to an illustrative embodiment of the invention, where different choices have been selected by the user on the different examples of the user preference item screen;

FIG. 10 depicts diagrammatic illustrations of several different examples of an expectations scale screen of the computer-based system for profile matching, according to an illustrative embodiment of the invention, where different slider indicator positions have been selected by the user on the different examples of the user preference item screen;

Throughout the figures, the same parts are always denoted using the same reference characters so that, as a general rule, they will only be described once.

DETAILED DESCRIPTION OF EMBODIMENTS OF THE INVENTION

The present invention is described herein, in an exemplary manner, with reference to hardware components, computer system architecture, and flowcharts that illustrate exemplary processes carried out by the computer system. In a preferred embodiment, functional blocks of the flowchart illustrations can be implemented by computer system instructions. These computer program instructions may be loaded directly onto an internal data storage device of a computing device (e.g., a hard drive of a server). Alternatively, these computer program instructions could be stored on a portable non-transitory computer-readable medium (e.g., a flash drive, a floppy disk, a compact disk, etc.), and then subsequently loaded onto a computing device such that the instructions can be executed thereby. In other embodiments, these computer program instructions could be embodied in the hardware of the computing device, rather than in the software thereof. It is also possible for the computer program instructions to be embodied in a combination of both the hardware and the software. Also, in the disclosure, when a reference is made to a computing device or processor that is "configured to", "arranged to" and/or "operable to" perform a specific function, it is to be understood that, in one or more embodiments of the invention, this means that the computing device or processor is specially programmed to carry out the particular function (e.g., the computing device or processor being specially programmed to perform a specific function).

This description describes in general form the computer program(s) required to carry out the various features of the invention. Any competent programmer in the field of information technology could develop a functioning system using the description set forth herein.

For the sake of brevity, conventional computer system components, conventional data networking, and conventional software coding will not be described in detail herein. Also, it is to be understood that the connecting lines shown in the block diagram(s) included herein are intended to represent functional relationships and/or operational couplings between the various components. Similarly, connecting lines are also used between the elements of the flowcharts in order to illustrate the functional relationships therebetween. In addition to that which is explicitly depicted, it is to be understood that many alternative or additional functional relationships and/or physical connections may be incorporated in a practical application of the system.

Figure 1:
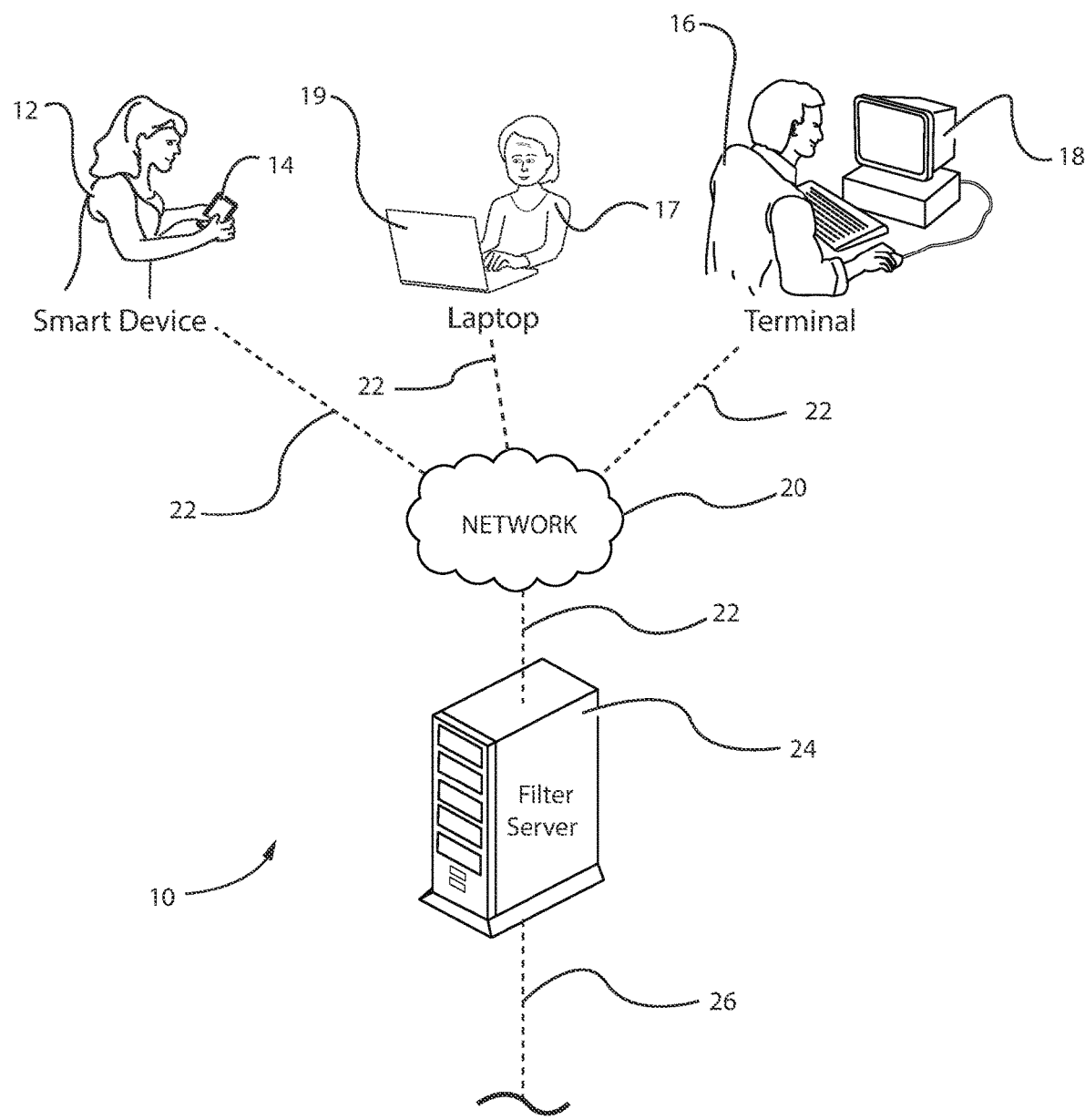
FIG. 1 is a system architecture diagram of a computer-based system for profile matching, according to an illustrative embodiment of the invention.

An illustrative embodiment of a computer-based system for profile matching is seen generally at 10 in FIG. 1. With reference to the illustrative embodiment of FIG. 1, it can be seen that first, second, and third system users 12, 16, 17 interact with a central server 24 through respective first, second, and third electronic devices 14, 18, 19, which are just examples of the many different devices that may be connected to the central server 24. In the illustrative embodiment, the first electronic device 14 may comprise a smartphone or other type of portable electronic device (e.g., a laptop, a tablet, etc.). The second electronic device 18 may comprise a desktop computer or other type of terminal computing device (e.g., a tower computing device, etc.). The third electronic device 19 may comprise a laptop computer or other type of portable computing device (e.g., a tablet, etc.). However, it is to be understood that electronic devices of any suitable nature may interact with a central server 24, such as a smartphone, a personal computer, an electronic notebook, a laptop, a personal digital assistant (PDA), or any other suitable device capable of communicating in a computer-based network. The first, second, and third electronic devices 14, 18, 19 each may comprise an interface and display so that the users 12, 16, 17 are able to interact with the devices 14, 18, 19. The interfaces of the devices 14, 18, 19 may comprise any suitable interface for a human user, such as a touchscreen user interface, a video camera, a microphone, a keyboard, a mouse, or any other appropriate equipment according to particular configurations and arrangements. In the illustrative embodiment, the central server 24 comprises memory and one or more central processing units (CPUs). The memory of the central server 24 may store multiple databases (e.g., for containing profile information regarding the users of the profile matching system). The first, second, and third electronic devices 14, 18, 19 and the central server 24 are communicatively coupled via network connections 22 and network 20.

In the illustrative embodiment, the computer-based system for profile matching 10 comprises a system for facilitating an online dating scenario in a network environment. Although, in other embodiments, the system 10 can be utilized to match users for other purposes (e.g., friendships, activity partners, other social and extracurricular activities, etc.). In the illustrative embodiment, the system 10 may comprise an online dating application ("app") and website connected to an Internet-based network that allows an individual system user to set filters in order to find and communicate with other system users who meet both of the users' filtered choices. In the illustrative embodiment, the preferences of both matched users must be met before user profiles are shared and communication is enabled.

In the illustrative embodiment, the system users 12, 16, 17 may be individuals wishing to participate in an online dating scenario. The system users 12, 16, 17 may also seek to access or to initiate a communication with other users that may be delivered via network 20. System users may review data (e.g., profiles) associated with other system users in order to make matching decisions. The term "data", as it is used herein, refers to any type of text, numeric, voice, video, or script data, or any other suitable information in any appropriate format that may be communicated from one point to another. Also, in the system 10, it is to be understood that any number of system user electronic devices may be operatively connected to the central server 24 by means of the network 20 (e.g., a first system user electronic device, a second system user electronic device, a third system user electronic device, etc.).

In the illustrative embodiment, the network 20 is a communicative platform operable to exchange data or information emanating from system users 12, 16, 17. Network 20 could be an Internet-based network, a local area network (LAN), a metropolitan area network (MAN), wide area network (WAN), wireless local area network (WLAN), virtual private network (VPN), intranet, telephone network, or any other appropriate architecture or system that facilitates communications in a computer environment, including a combination of any networks or systems described above. In the illustrative embodiment, network connections 22 may include, but are not limited to, wired and/or wireless network connections which may include routers and firewalls. Also, as shown in FIG. 1, the central server 24 may be connected to additional devices or networks by means of device/network connection 26.

In the illustrative embodiment, the central server 24 is operable to receive and to communicate information to electronic devices 14, 18, 19. In some embodiments, central server 24 may comprise a plurality of servers or other equipment (e.g., data storage devices in a form of hard drives), each performing different or the same functions in order to receive and communicate information to electronic devices 14, 18, 19. The central server 24 may include software and/or algorithms to achieve the operations for processing, communicating, delivering, gathering, uploading, maintaining, and/or generally managing data, as described herein. Alternatively, such operations and techniques may be achieved by any suitable hardware, component, device, application specific integrated circuit (ASIC), additional software, field programmable gate array (FPGA), server, processor, algorithm, shared memory clusters, erasable programmable ROM (EPROM), electrically erasable programmable ROM (EEPROM), or any other suitable object that is operable to facilitate such operations.

Figure 2:
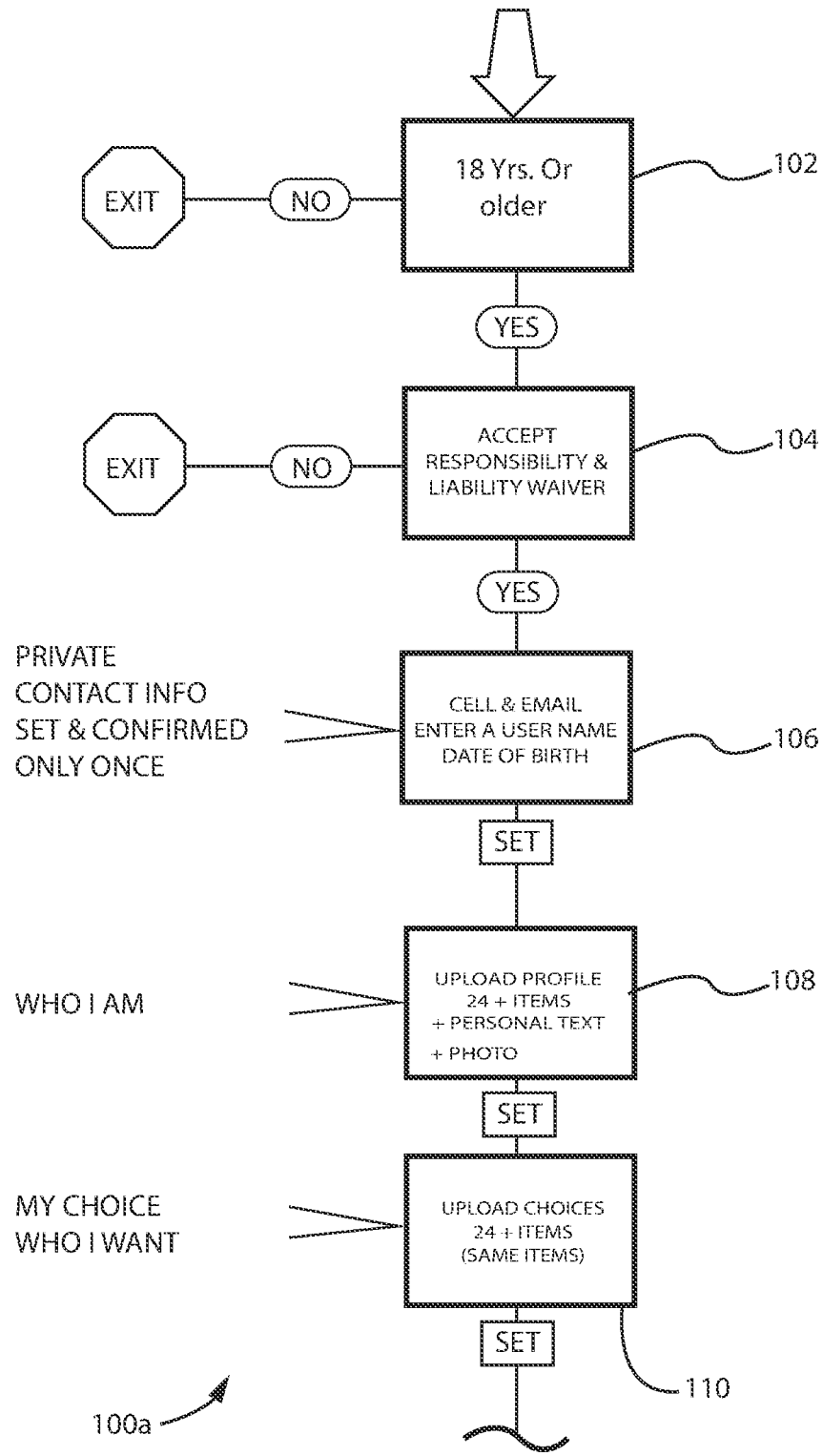
FIG. 2 is a partial flowchart depicting functional steps of the computer-based system for profile matching, according to an illustrative embodiment of the invention.
Figure 3:
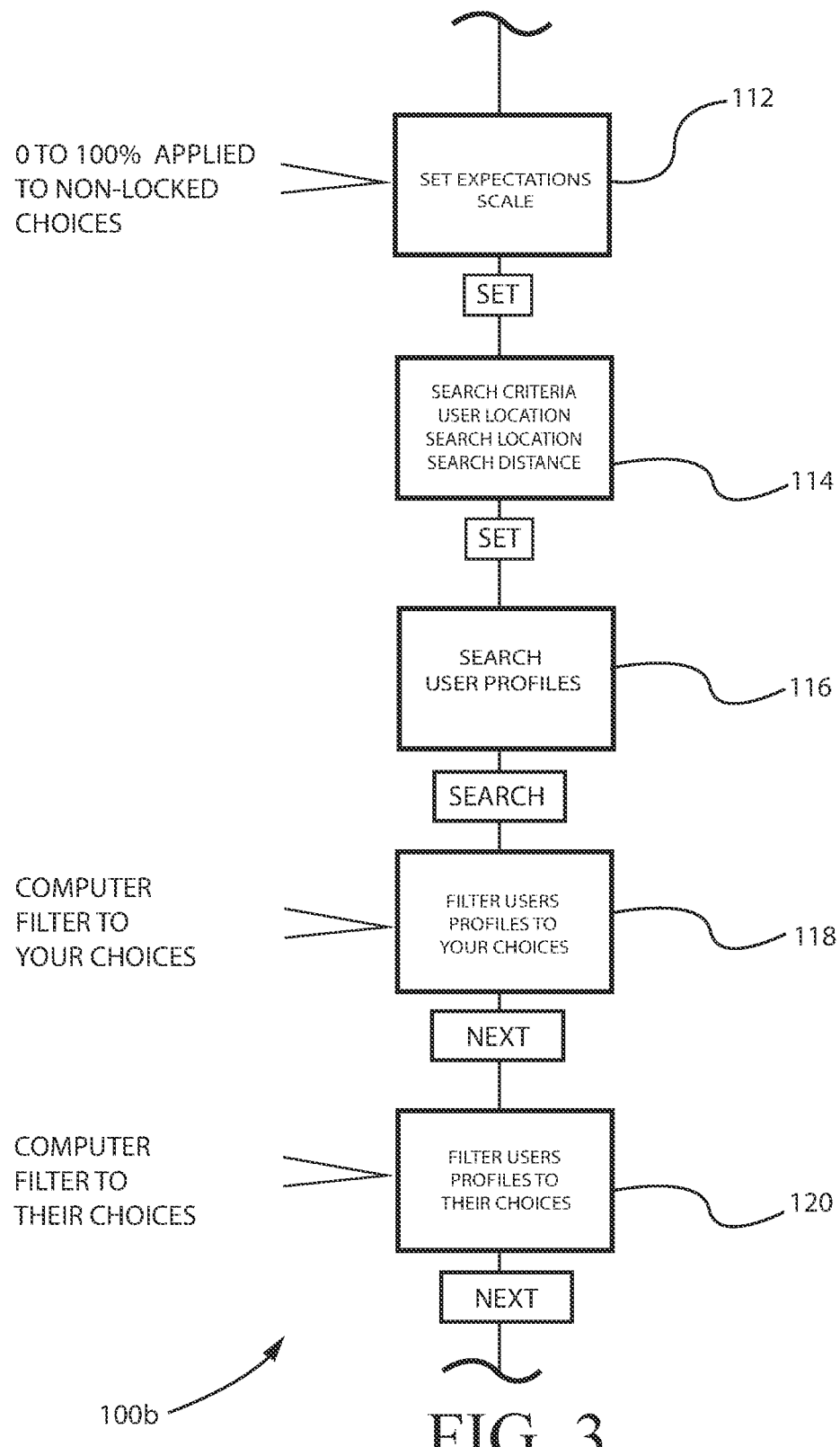
FIG. 3 is a continuation of the flowchart of FIG. 2, which illustrates additional steps of the computer-based system for profile matching, according to the illustrative embodiment of FIG. 2.
Figure 4:
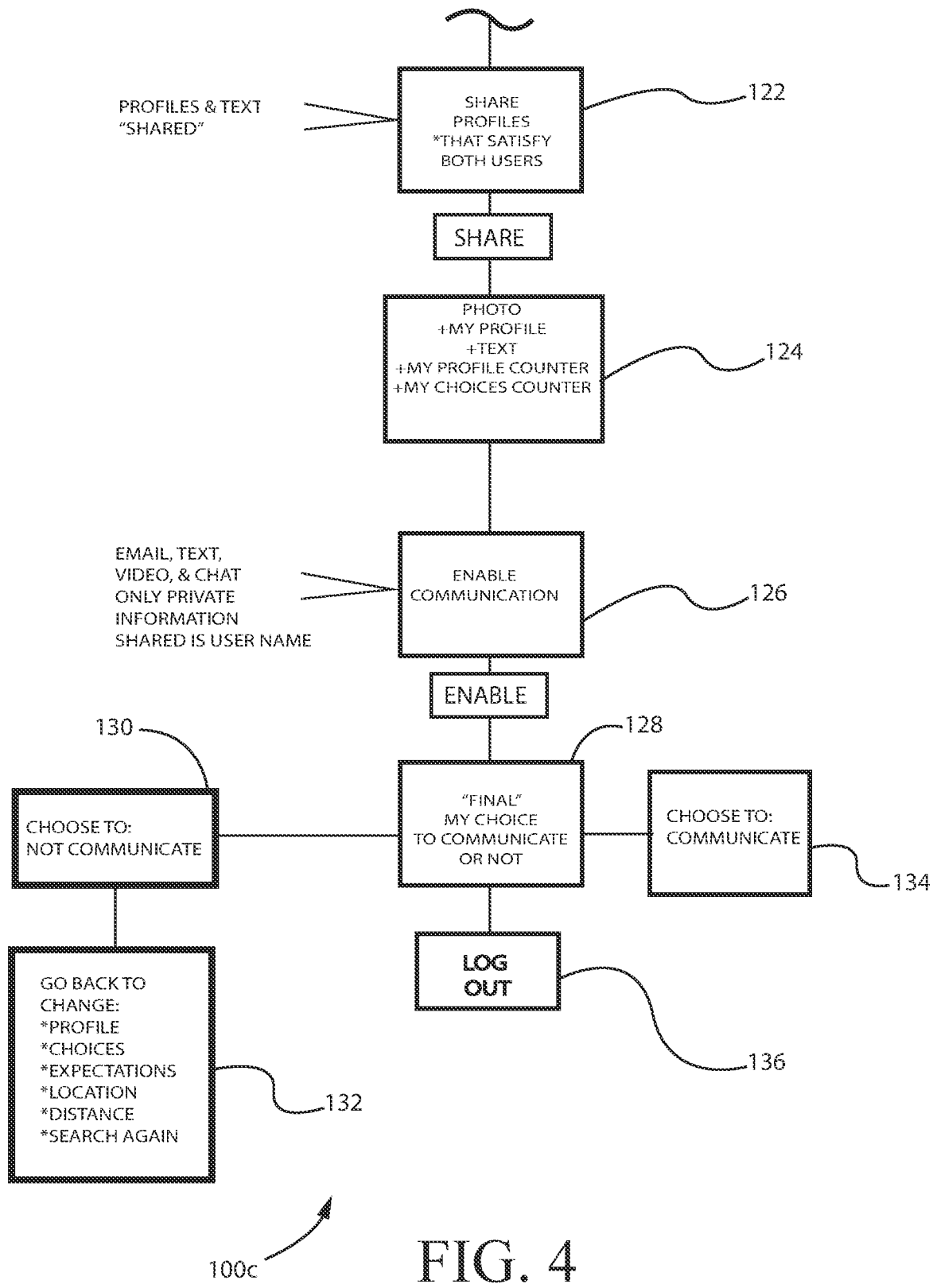
FIG. 4 is a continuation of the flowchart of FIG. 3, which illustrates additional steps of the computer-based system for profile matching, according to the illustrative embodiment of FIG. 2.

In accordance with an illustrative embodiment, a flowchart illustrating the functionality of the computer-based system for profile matching 10 is set forth in FIGS. 2-4. Referring initially to the first flowchart portion 100a in FIG. 2, the illustrative method carried out by the system 10 commences when the system user enters the software application (commonly abbreviated as "app"). Then, in step 102, the system user is asked by the software application whether he or she is 18 years old or older. If the system user indicates to the software application that he or she is 18 years old or older, then process continues to step 104, otherwise the system user is exited from the software application (the system user must be 18 years old or older to use the software application). In step 104, the system user is asked by the software application if he or she accepts responsibility and the liability waiver required to utilize the software application (the system user must accept responsibility for using the software application, and the operator of the software application is not liable to any user as it does not guarantee the authenticity of any user). If the system user accepts responsibility for using the software application and the liability waiver, then process continues to step 106, otherwise the system user is exited from the software application. Next, in step 106 of the illustrative method, the system user is required to enter a username and date of birth, as well as certain private contact information (e.g., mobile phone number, email address, etc.). The software application does not share the private contact information with any other system user. In the illustrative embodiment, the username, date of birth, and private contact information of the system user is set and confirmed only once. In the illustrative embodiment, privacy is maintained throughout the process.

Figure 5:
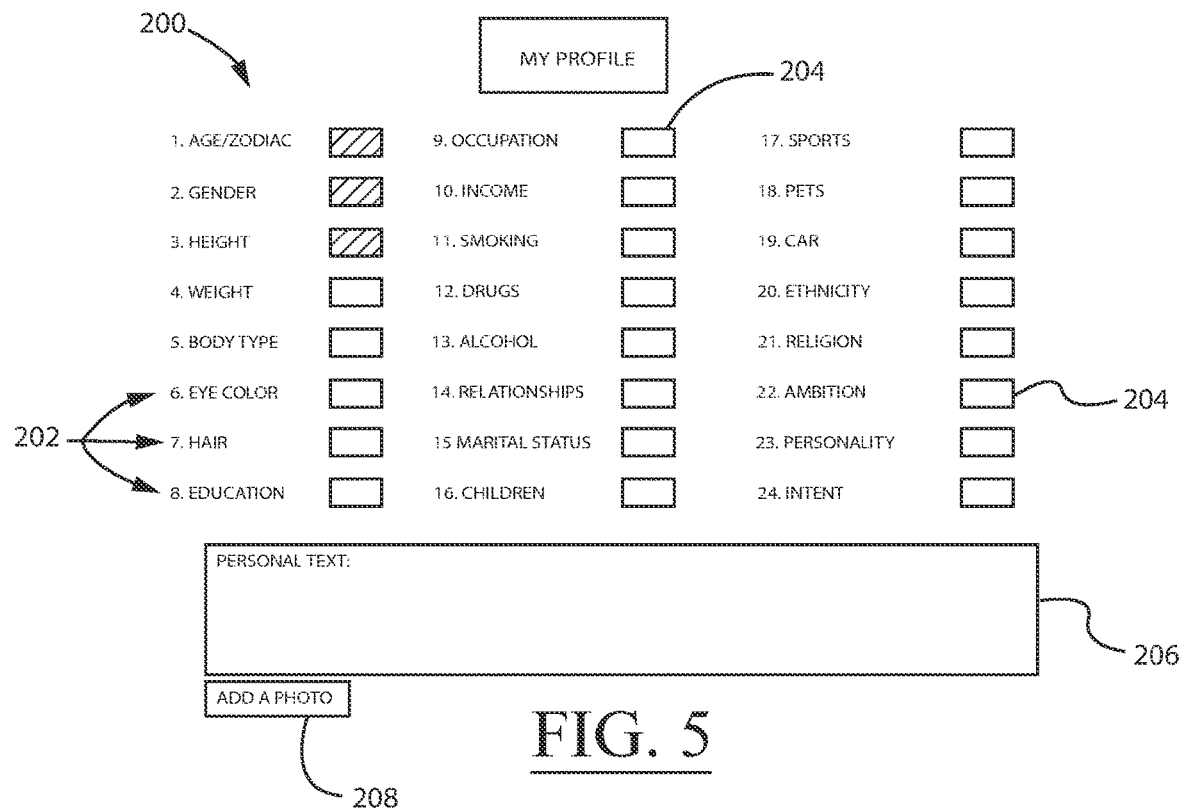
FIG. 5 is a diagrammatic illustration of a user profile screen of the computer-based system for profile matching, according to an illustrative embodiment of the invention.

After completing step 106 of the illustrative method, the system user enters his or her profile information in step 108. As shown in the diagrammatic user profile screen image 200 of FIG. 5, in the illustrative embodiment, the user profile information may include various user attributes 202 (e.g., age, gender, height, weight, body type, etc.), a personal/customized message (e.g., entered in text box 206), and a photograph of the system user uploaded by depressing button 208. In FIG. 5, it can be seen that a completion indicator box 204 may be provided next to each of the user attributes 202 so as to indicate whether or not that item has already been completed by the system user. In the exemplary screen image 200 of FIG. 5, the completion indicator boxes 204 next to the first three user attributes 202 (i.e., age, gender, and height) are filled-in so as to indicate that these items have already been completed by the system user.

Figure 7:
FIG. 7 is a diagrammatic illustration of a user profile item screen of the computer-based system for profile matching, according to an illustrative embodiment of the invention.

Turning to FIG. 7, a diagrammatic input data screen image 211 for one of the user profile items is shown (i.e., Item 11/Smoking, which describes the attributes of the system user with regard to smoking). In the illustrative embodiment, the processor of the system 10 is operable to generate an input data screen image for each of the user profile items 202 depicted in FIG. 5 so that the system user is able to input his or her attributes into the system 10 so that the selections are able to be used in the matching process by the system 10 comparing the attributes of the system user to the user preferences of the other system users. As shown in the example of FIG. 7, selection boxes 213 are provided next to each of the selections that the system user may choose to describe his or her daily smoking habits. In FIG. 7, the selected choice of "No" is indicated by the filled-in box 215 to signify that the system user does not smoke on a daily basis. In step 108, the system user completes all twenty-four (24) or more of the user profile items 202 in FIG. 5 by making selections in a similar manner to that which is depicted in the exemplary input data screen image 211 of FIG. 7. In the illustrative embodiment, when each item 202 of the user profile on FIG. 5 is selected by the system user, the processor of the system 10 is operable to presents a new screen to the system user with toggle selections within the profile item. Once the item toggle selections are chosen by the system user, the item is completed, and that item will indicate complete with a filled-in color (e.g., as shown in the first three profile items 202 of FIG. 5). In the illustrative embodiment, none of the user profile information of the system user is shared with other system users unless there is a match with another system user.

Figure 6:
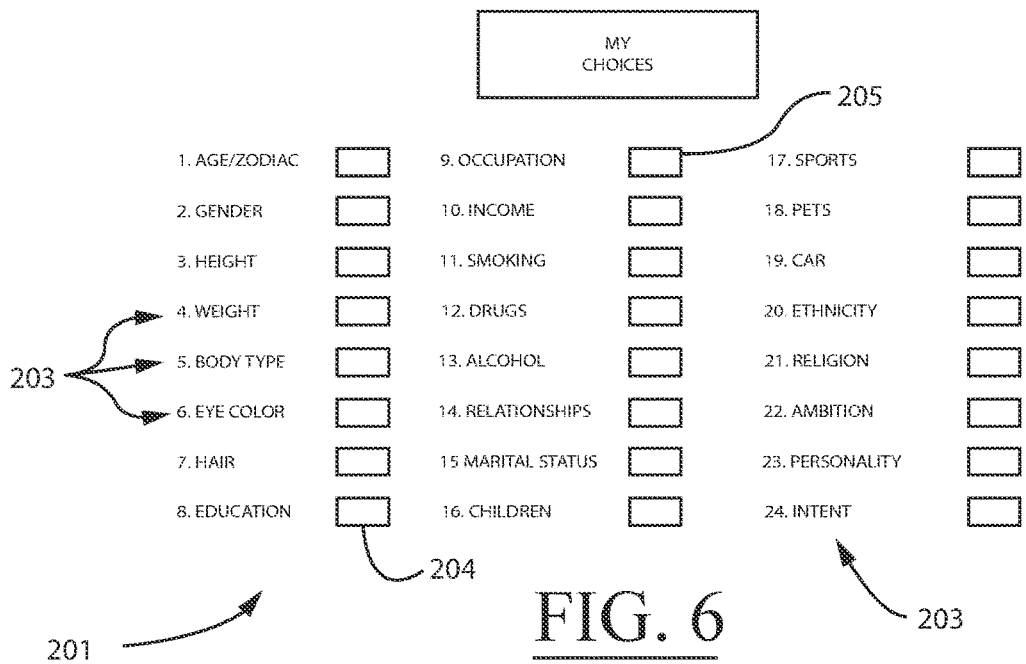
FIG. 6 is diagrammatic illustration of a user preference screen of the computer-based system for profile matching, according to an illustrative embodiment of the invention.

Next, with reference again to FIG. 2, in step 110, the system user enters his or her user preference or choices information, which is used by the system 10 for matching the system user with other system users by the system 10 comparing the user preferences of the system user to the profile items of the other system users. As shown in the diagrammatic user preference screen image 201 of FIG. 6, in the illustrative embodiment, the user preference information may include various user preferences 203 (e.g., age, gender, height, weight, body type, etc.). In FIG. 6, it can be seen that a completion indicator box 205 may be provided next to each of the user preferences 203 so as to indicate whether or not that preference item has already been completed by the system user.

Figure 8:
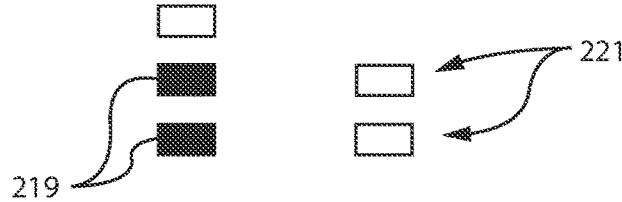
FIG. 8 is a diagrammatic illustration of a user preference item screen of the computer-based system for profile matching, according to an illustrative embodiment of the invention.

Turning to FIG. 8, a diagrammatic input data screen image 217 for a first one of the user preference items is shown (i.e., Item 10/Income, which describes the preference of the system user with regard to another system user's annual income). In the illustrative embodiment, the processor of the system 10 is operable to generate an input data screen image for each of the user preference items 203 depicted in FIG. 6 so that the system user is able to input his or her preferences into the system 10 so that the preferences or choices are able to be used in the matching process. As shown in the example of FIG. 8, selection boxes are provided next to each of the selections that the system user may choose to describe his or her preference(s) for the income of another system user. In FIG. 8, the selected choices of "$75,000 to $100,000" and "Greater Than $100,000" are indicated by the filled-in boxes 219 to signify that the system user would like to be matched with one or more other system users that have annual incomes either of "$75,000 to $100,000" or "Greater Than $100,000". In FIG. 8, it can also be seen that lock choice selection boxes 221 are provided next to the filled-in boxes 219 in order to allow the system user to lock these selections if desired. In FIG. 8, because lock choice selection boxes 221 are empty and not filled-in, these selections are not locked user preferences of the system user, and thus will be subject to the expectations scale 222 described hereinafter.

Now, referring to FIG. 9, diagrammatic input data screen images 210, 210', 210", 210''' for a second one of the user preference items is shown (i.e., Item 11/Smoking, which describes the preference of the system user with regard to another system user's daily smoking habits). As shown in the examples of FIG. 9, selection boxes 212 are provided next to each of the selections that the system user may choose to describe his or her preferences for the daily smoking habits of another system user. Also, as shown in the examples of FIG. 9, it can also be seen that lock choice selection boxes 216 are provided next to some of the selection boxes 212 in order to allow the system user to lock these selections if desired. In step 110, the system user completes all twenty-four (24) or more of the user preference items 203 in FIG. 6 by making selections in a similar manner to that which is depicted in the exemplary input data screen images 210, 210', 210", 210''', 217 of FIGS. 8 and 9. Advantageously, in the illustrative embodiment, the ability of the system user to filter and lock all twenty-four (24) or more of the user preference items 203 gives the system user complete control to pick exactly who he or she wants.

In the first exemplary input data screen image 210 of FIG. 9, the selected choice of "No" is indicated by the filled-in box 214 to signify that the system user preferably wants to be matched with another system user that does not smoke on a daily basis. In the first exemplary input data screen image 210 of FIG. 9, because the lock choice selection box 216 is empty and not filled-in, this selection is not a locked user preference of the system user, and thus will be subject to the expectations scale 222 described hereinafter.

In the second exemplary input data screen image 210' of FIG. 9, similar to the first exemplary input data screen image 210, the selected choice of "No" is indicated by the filled-in box 214 to signify that the system user wants to be matched with another system user that does not smoke on a daily basis. However, unlike the first exemplary input data screen image 210, a filled-in lock choice selection box 218 is provided next to the selected choice of "No" in the second exemplary input data screen image 210' to indicate that this selection is a locked user preference of the system user that must be met during the matching process, and thus will be not subject to the expectations scale 222 described hereinafter.

In the third exemplary input data screen image 210" of FIG. 9, the selected choices of "No" and "Some" are indicated by the filled-in boxes 214 to signify that the system user wants to be matched with another system user that either does not smoke on a daily basis or just smokes some on a daily basis. In the third exemplary input data screen image 210" of FIG. 9, filled-in lock choice selection boxes 218 are provided next to the selected choices of "No" and "Some" to indicate that these selections are locked user preferences of the system user, and that at least one of these two locked choices must be met during the matching process. In this example, the system user may toggle the lock choice option for more than one element within a user preference item. In the third exemplary input data screen image 210" of FIG. 9, one of the locked elements within the user preference item (i.e., Item 11/Smoking) must be met (i.e., either the other system user must not smoke on a daily basis or just smoke some on a daily basis).

In the fourth exemplary input data screen image 210'" of FIG. 9, all of the possible selection choices of "No", "Some", "Yes", and "Anything" are indicated by the filled-in boxes 214 to signify that the system user does not care if the other system user smokes or not. In other words, the selection of all choices allows the system user to eliminate "Smoking" as a means for filtering other system users during the matching process.

In the illustrative embodiment, when a user preference 203 is locked by a system user, then that locked user preference 203 must be met during a matching request. The non-locked user preferences 203 are placed into a percentage of expectations group that is governed by the expectations scale 222 described hereinafter. In the illustrative embodiment, the expectations scale 222 is applied to all non-locked choices. The expectations scale percentage is set by the system user.

In the illustrative embodiment, all of the user preferences 203 of a system user are lockable by the system user so as to require that any locked user preference 203 be met during a matching request.

Now, referring to the second flowchart portion 100b in FIG. 3, the illustrative method carried out by the system 10 continues with step 112. In this step, the system user selects, on an expectations scale, a percentage (e.g., from 0% to 100%) of non-locked user preferences that are required to be met during a matching request. As shown in the diagrammatic expectations scale screen images 220, 220', 220" of FIG. 10, the processor generates an expectations scale 222 on the graphical user interface of an electronic device (e.g., smartphone) of the system user. In the illustrative embodiment, the expectations scale 222 generated by the processor is a sliding scale for all non-locked user preferences or choices. All locked choices of the system user must still be met during a matching request. In the first exemplary screen image 220, the sliding indicator 224 is positioned at 100% on the expectations scale 222 such that all of the non-locked user preferences of the system user must be met by any other system user with whom the system user is matched. For example, if the system user had a total of ten (10) non-locked user preferences, then all ten (10) non-locked user preferences would have to be met in the first exemplary screen image 220. In the second exemplary screen image 220' of FIG. 10, the sliding indicator 224 is positioned at 50% on the expectations scale 222 such that at least 50% of the non-locked user preferences of the system user must be met by any other system user with whom the system user is matched. For example, if the system user had a total of ten (10) non-locked user preferences, then at least 50% or five (5) out of the ten (10) non-locked user preferences would have to be met in the second exemplary screen image 220'. In the third exemplary screen image 220" of FIG. 10, the sliding indicator 224 is positioned at 0% on the expectations scale 222 so that none of the non-locked user preferences of the system user are required to be met by any other system user with whom the system user is matched (e.g., if a system user is unsure of what he or she wants). For example, if the system user had a total of ten (10) non-locked user preferences, then none of the ten (10) non-locked user preferences would have to be met in the third exemplary screen image 220". As the number of total system users on the online dating platform grows over time, the expectations scale 222 will be helpful in limiting the quantity of matches to system users that meet a majority, but not all of the non-locked user preferences of the system user running the matching request. As shown in FIG. 10, the processor may generate a numerical readout (e.g., 100%, 50%, 0%) of the percentage of the system user's non-locked choices that must be met when a match is made so that the system user is able to easily view the numerical percentage value of non-locked choices without trying to approximate the value from the position of the sliding indicator 224 on the expectations scale 222.

Figure 11:
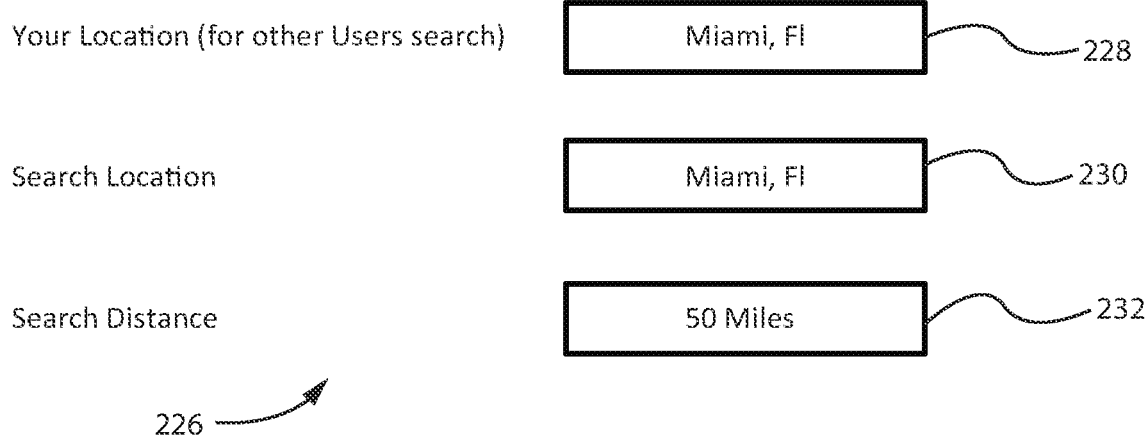
FIG. 11 is a diagrammatic illustration of a search criteria screen of the computer-based system for profile matching, according to an illustrative embodiment of the invention.

Turning again to FIG. 3, in step 114, the system user defines additional search criteria, such as the system user's location, the search location, and the search distance so that the matching request is able to be limited to a certain geographical region. As shown in the diagrammatic search criteria screen image 226 of FIG. 11, the processor generates a user location selection box 228, a search location selection box 230, and a search distance selection box 232. These selection options set the location of the system user for matching requests performed by other system users (i.e., user location selection box 228), as well as setting the search location for matching requests performed by the system user (i.e., search location selection box 230). The search distance selection box 232 limits the search distance to within the desired number of miles. In the example shown in FIG. 11, the search is limited to other system users within 50 miles of Miami, Fla.

Then, in step 116 of the FIG. 3, the system user searches the user profiles of other system users. In the illustrative embodiment, the user interface of the system 10 may comprise a "Search" button for initiating the search process. In the illustrative embodiment, the profile matches determined for the system user are based on a two-way filtering process. First, in step 118, the matching pool of other system users is initially filtered based on the user preferences of the system user that is performing the search (i.e., the first system user). Secondly, in step 120, the matching pool of other system users is subsequently filtered based on the user preferences of the other system users that are being searched by the first system user.

In the illustrative embodiment, the processor of the system 10 is operable to: (i) determine whether all locked user preferences (e.g., see FIG. 9) of a first system user (e.g., as defined in step 110 above) are met by one or more other system users in response to receiving an electronic matching request from the first system user; (ii) determine whether all locked user preferences of the one or more other system users are met by the first system user in response to receiving the matching request; (iii) determine whether the percentage of non-locked user preferences (e.g., see expectations scale of FIG. 10) of the first system user are met by the one or more other system users and whether the percentage of non-locked user preferences of the one or more other system users are met by the first system user, in addition to all locked user preferences of the first system user being met by the one or more other system users and all locked user preferences of the one or more other system users being met by the first system user; and (iv) when the percentage of non-locked user preferences of the first system user additionally are met by the one or more other system users and the percentage of non-locked user preferences of the one or more other system users additionally are met by the first system user, display the profile information regarding the one or more other system users to the first system user so that the first system user is able to initiate communication with the one or more other system users. Conversely, when an electronic matching request is submitted by the one or more other system users, the processor of the system 10 displays profile information regarding the first system user to the one or more other system users so that communication can be initiated when the locked user preferences and the percentage of non-locked user preferences of both users is met.

In the illustrative embodiment, when all locked user preferences of the first system user are not met by another system user and/or all locked user preferences of the other system user are not met by the first system user, the processor of the system 10 does not display profile information regarding the other system user to the first system user, and the processor of the system 10 does not display profile information regarding the first system user to the other system user. Also, in the illustrative embodiment, when the percentage of non-locked user preferences of the first system user are not met by the one or more other system users and/or the percentage of non-locked user preferences of the one or more other system users are not met by the first system user, the processor of the system 10 does not display profile information regarding the one or more other system users to the first system user. Conversely, when an electronic matching request is submitted by the one or more other system users, the processor of the system 10 does not display profile information regarding the first system user to the one or more other system users unless the locked user preferences and the percentage of non-locked user preferences of both users is met.

In the illustrative embodiment, when at least one user preference of the first system user that is electronically received by the interface comprises a plurality of locked choices (e.g., as described in the third exemplary input data screen image 210" of FIG. 9), the processor of the system 10 is further operable to determine that all locked user preferences of the first system user are met by the one or more other system users when at least one of the plurality of locked choices (e.g., at least one of "No" and "Some" smoking in image 210" of FIG. 9) for the at least one user preference 203 of the first system user is met by the one or more other system users. That is, in the illustrative embodiment, when a user preference item 203 has more than one locked selection choice, and at least one of the locked selection choices must be met for the locked criteria of that user preference item 203 to be satisfied.

In the illustrative embodiment, profile information is displayed when the locked user preferences and percentage of expectations of both users being considered for a match are met. The processor of the system 10 filters to the choices of both users. The profile information of a matching user is displayed when the locked user preferences and percentage of expectations of both users is met. The determination of whether the percentage of expectations is met is based on quantity of non-locked preferences (e.g., if a system user has ten (10) non-locked user preferences, then at least 50% or five (5) out of the ten (10) non-locked user preferences must be met).

Figure 12:
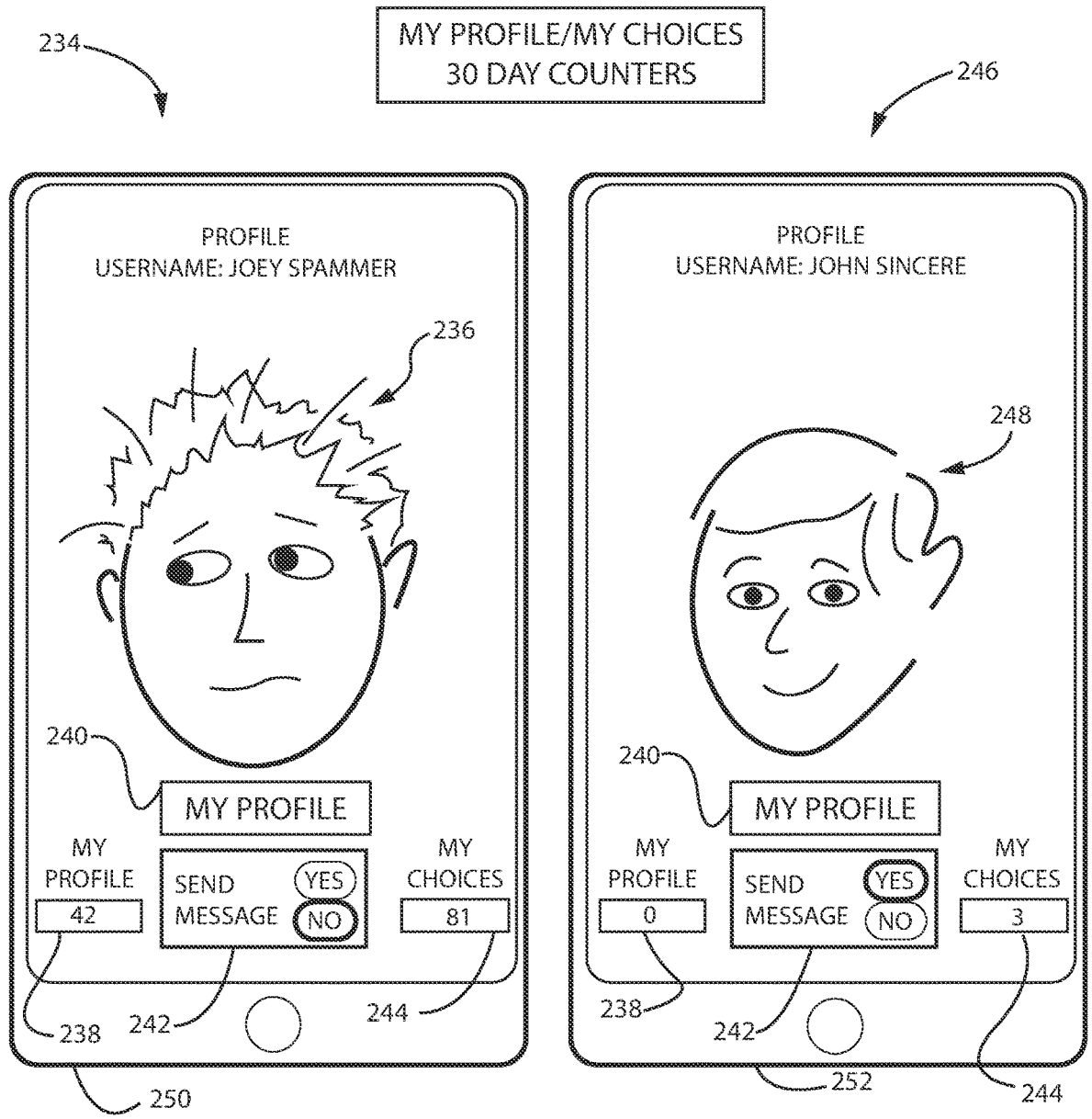
FIG. 12 depicts diagrammatic illustrations of two different examples of user profile summary screens of the computer-based system for profile matching, according to an illustrative embodiment of the invention, where user profile summary screens are displayed for exemplary first and second matched users.

Next, with reference to the third flowchart portion 100c in FIG. 4, the illustrative method carried out by the system 10 continues with step 122. In this step, the system shares the profiles with the first system user that satisfies both his or her user preferences and the user preferences of the other system users in the search pool. For each of the user profiles that are shared with the first system user, in step 124, the system may be configured to display profile summary screens, such as the exemplary profile summary screens 234, 246 depicted in FIG. 12. As shown in FIG. 12, each of the displayed profile summary screens 234, 246 may include a digital photograph 236, 248 of the matched user, a profile changes counter 238 displaying the number of times the profile of the user has changed in the last 30 days prior to the search, a user profile button 240 for accessing more details about the matched user (e.g., for viewing the whole profile of the matched user), a send message box 242 for initiating communication with the matched user, and a user preference changes counter 244 displaying the number of times that one or more user preferences of the user have changed in the last 30 days prior to the search. In the illustrative embodiment, the profile changes counters 238 on the exemplary profile summary screens 234, 246 are in a form of rolling 30-day counters that count changes in the profile of the system users (i.e., how many times has the user changed his or her profile in the last 30 days), while the user preference changes counters 244 on the exemplary profile summary screens 234, 246 are in a form of rolling 30-day counters that count changes in the user preferences of the system users (i.e., how many times has the user changed his or her user preferences or choices in the last 30 days). Advantageously, the profile summary screens 234, 246 afford the system user the final choice on whether to communicate or not after a user profile is shared. By selecting either "Yes" or "No" in the send message box 242, the system user is able to choose whether he or she would like to communicate with matched users depicted in the profile summary screens 234, 246. As shown in FIG. 12, in the illustrative embodiment, the profile summary screens 234, 246 may be viewed on smartphones 250, 252 by system users, or on any other suitable electronic device that includes an interface and display.

In FIG. 12, the first exemplary profile summary screen 234 illustrates the profile of a potential insincere system user with the username "Joey Spammer". The profile changes counter 238 on the profile summary screen 234 indicates that "Joey Spammer" has changed his profile forty-two (42) times in last 30 days, while the user preference changes counter 244 indicates that "Joey Spammer" has changed his user preferences eighty-one (81) times in last 30 days. The system user may choose not to communicate with "Joey Spammer" because a large number of profile changes and/or user preference changes in the last 30 days is frequently an indication that the user associated with the profile is an insincere user (e.g., a spammer or another type of insincere user that does not intend to use the online dating platform for a legitimate purpose).

In FIG. 12, the second exemplary profile summary screen 246 illustrates the profile of a potential sincere system user with the username "John Sincere". The profile changes counter 238 on the profile summary screen 246 indicates that "John Sincere" has changed his profile zero (0) times in last 30 days, while the user preference changes counter 244 indicates that "John Sincere" has changed his user preferences only three (3) times in last 30 days. The system user may choose to communicate with "John Sincere" because zero or a small number of profile changes and/or user preference changes in the last 30 days is frequently an indication that the user associated with the profile is a sincere user (e.g., a system user that intends to use the online dating platform for a legitimate purpose).

Advantageously, the profile changes counter 238 and the user preference changes counter 244 help the system user in determining whether to communicate or not with a matched system user. In the illustrative embodiment, these count changes made to the profile and user preferences each time a search is made. Several searches changing expectations scale or search criteria do not affect these counters. The profile changes counter 238 should be close to zero because the personal attributes of a system user should not change. A large number in the profile changes counter 238 would likely indicate a system user without integrity, such as a spammer. Likewise, someone changing their user preferences often, which would result in the user preference changes counter 244 having a large number, demonstrates indecisiveness or a spammer as well. The profile changes counter 238 and the user preference changes counter 244 allow a system user to eliminate user profiles from consideration that are being constantly updated.

Turning again to the third flowchart portion 100c in the illustrative embodiment of FIG. 4, the system 10 enables communication between the first system user and any matched users in step 126. In the illustrative embodiment, the communication may be in the form of email, text messages, audio and/or video chatting, telephonic communication, etc. However, in the illustrative embodiment, initially the only private information that is shared by the system 10 between the matched system users is the username of each system user, the optional text in box 206 of FIG. 5, and any photograph that has been uploaded by the user. In step 128 of the illustrative process carried out by the system 10, the system user has the final choice whether or not to communication with other system user(s). If the system user chooses not to communicate with the other system user(s) in step 130, then the processor of the system 10 will direct the user to step 132. In step 132, the system user is able to change one or more of: (i) his or her profile, (ii) his or her user preferences or choices, (iii) his or her expectations using the expectations scale, (iv) his or her search location, and (v) his or her search distance. Also, in step 132, the system user is given the option of running the search again. Conversely, if the system user chooses to communicate with the other system user(s) in step 134, then the system user may use the forms of communication described above to start a conversation with the system user(s). Finally, after making a choice whether or not to communication with other system user(s) in step 128, the system user also may choose to log out of the system 10 in step 136.

It is readily apparent that the aforedescribed computer-based system 10 for profile matching offers numerous advantages. First, the computer-based system 10 for profile matching provides system users with substantial control over the individuals with whom they are matched. That is, the lockable and non-lockable preferences described above give system users substantial control over whose profiles and pictures will be displayed to them by the system 10.

Limiting the number of displayed matches saves time, and helps to eliminate dating fatigue. In the illustrative embodiments described above, the computer-based system 10 gives the system users complete control over all their preferences and filters, which include locked preferences and the percentage of non-locked preferences that must be met using the sliding expectations scale 222. As a result, higher quality matches are produced, while significantly less time is spent online. Secondly, the computer-based system 10 for profile matching takes into account the two-way compatibility of users in order to substantially increase the efficiency and effectiveness of the matching process. In the illustrative embodiments described above, the choices of both the user performing the search and the user with whom the searching user is matched are taken into account by the system 10, thereby limiting the matched users to the ones that are actually interested in the attributes of the user performing the search. In the illustrative embodiments, before a profile is shared and communication enabled, the preferences of both matched users must be met. Thus, when performing a search, a system user will only be provided with matched users for whom the user also meets their choices. The two-way compatibility functionality of the system 10 saves users even more time, and further eliminates dating fatigue. Thirdly, unlike conventional dating applications that traditionally share a user's photograph and profile with anyone who wants to see that user profile, the computer-based system 10 for profile matching described above enhances privacy by only sharing a user's photograph and profile with other users that the user want to view, and further still, to only those other users who want to see that user. Advantageously, this functionality of the system 10 significantly limits the exposure of the user's photograph and profile to only a select few users, rather than to all of the users on the system. Finally, the computer-based system 10 for profile matching facilitates the identification of fake user profiles and/or spammers by a system user. As described above, in the illustrative embodiment, the profile and preferences counters 238, 244 assist in further identifying non-desirable users prior to a user initiating communication with another system user. As described above, the profile and preferences counters 238, 244 are rolling counters that are updated between searches. Because the counters 238, 244 are included under the profiles when sharing is enabled (e.g., see FIG. 12), users are able to easily avoid communicating with matched users having very high count numbers, as these matched users may be fake, spammers, or indecisive in which qualities they want.

In the illustrative embodiment, the computer-based system 10 for profile matching requires the user preferences of two system users to match prior to a profile photograph being displayed to one of the system users. This feature of the system 10 is stark contrast to conventional online dating platforms that share the profile photograph prior to allowing the other attributes of each user to be investigated.

In one or more illustrative embodiments, a system user may be permitted to use the computer-based system 10 for profile matching totally free of charge, as a result of all system revenue being provided by advertising. Unlike conventional dating applications that typically have hidden costs and/or upgrade costs, complete access to the functionality of the system 10 described above may be granted to a system user free of charge, thereby dispelling the perception that all online dating applications require the system user to pay for the service.

Any of the features or attributes of the above described embodiments and variations can be used in combination with any of the other features and attributes of the above described embodiments and variations as desired.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A computer-based system for profile matching, the computer-based system comprising:
one or more servers having memory and one or more processing units, the one or more servers being connected to a network, and the one or more servers being operable to:
electronically receive a plurality of user profiles associated with a social networking platform, a first one of the user profiles comprising user preferences of a first system user, a second one of the user profiles comprising user preferences of a second system user, a third one of the user profiles comprising user preferences of a third system user, and a fourth one of the user profiles comprising user preferences of a fourth system user, at least some of the user preferences of the first, second, third, and fourth system users being lockable so as to require that any locked user preference be met during a matching request; and
electronically receive a first matching request, the first matching request electronically submitted by the first system user using a first electronic device; and
the one or more servers being configured to execute computer executable instructions to:
determine whether all locked user preferences of the first system user are met by the second system user in response to receiving the first matching request;
determine whether all locked user preferences of the second system user are met by the first system user in response to receiving the first matching request;
when at least all locked user preferences of the first system user are met by the second system user and all locked user preferences of the second system user are met by the first system user, display profile information regarding the second system user to the first system user so that the first system user is able to initiate communication with the second system user;
determine whether all locked user preferences of the first system user are met by the third system user in response to receiving the first matching request;
determine whether all locked user preferences of the third system user are met by the first system user in response to receiving the first matching request;
when all locked user preferences of the first system user are not met by the third system user and/or all locked user preferences of the third system user are not met by the first system user, do not display profile information regarding the third system user to the first system user;
determine whether all locked user preferences of the first system user are met by the fourth system user in response to receiving the first matching request;
determine whether all locked user preferences of the fourth system user are met by the first system user in response to receiving the first matching request; and
when all locked user preferences of the first system user are met by the fourth system user, but all locked user preferences of the fourth system user are not met by the first system user, do not display profile information regarding the fourth system user to the first system user, the profile information of the fourth system user being eliminated from a set of system users displayed to the first system user because the first system user did not meet all locked user preferences of the fourth system user even though the fourth system user did meet all locked user preferences of the first system user; and
the one or more servers being further configured to execute computer executable instructions to:
determine a first quantity of times that a user profile of a particular system user has been changed by the particular system user within a predetermined period of days; and
when displaying the profile information regarding the particular system user to another system user, the profile information of the particular system user includes the first quantity of times that the user profile has been changed by the particular system user within the predetermined period of days so as to assist the other system user in determining whether to communicate with the particular system user.

2. The computer-based system according to claim 1, wherein the first electronic device comprises a graphical user interface, and the one or more servers are further configured to execute computer executable instructions to:
generate an expectations scale on the graphical user interface of the first electronic device so that the first system user is able to select a percentage of non-locked user preferences that are required to be met during a matching request; and
the one or more servers are further operable to:
electronically receive the percentage of non-locked user preferences electronically submitted by the first system user using the first electronic device; and
in response to receiving the percentage of non-locked user preferences, the one or more servers are further configured to execute computer executable instructions to:
prior to displaying the profile information regarding the second system user to the first system user, further determine whether the percentage of non-locked user preferences of the first system user are met by the second system user and whether the percentage of non-locked user preferences of the second system user are met by the first system user, in addition to all locked user preferences of the first system user being met by the second system user and all locked user preferences of the second system user being met by the first system user;
when the percentage of non-locked user preferences of the first system user additionally are met by the second system user and the percentage of non-locked user preferences of the second system user additionally are met by the first system user, display the profile information regarding the second system user to the first system user so that the first system user is able to initiate communication with the second system user; and when the percentage of non-locked user preferences of the first system user are not met by the second system user and/or the percentage of non-locked user preferences of the second system user are not met by the first system user, do not display profile information regarding the second system user to the first system user.

3. The computer-based system according to claim 1, wherein the one or more servers are further configured to execute computer executable instructions to:

determine a second quantity of times that one or more user preferences of the particular system user have been changed by the particular system user within the predetermined period of days; and when displaying the profile information regarding the particular system user to the other system user, the profile information of the particular system user includes the second quantity of times that the one or more user preferences have been changed by the particular system user within the predetermined period of days so as to assist the other system user in determining whether to communicate with the particular system user.

4. The computer-based system according to claim 1, wherein the social networking platform comprises an online dating platform, and the user preferences of the first system user and the second system user are selected from the group consisting of: (i) age, (ii) gender, (iii) height, (iv) weight, (v) body type, (vi) eye color, (vii) hair, (viii) education, (ix) occupation, (x) income, (xi) smoking status, (xii) drug use, (xiii) alcohol use, (xiv) relationship information, (xv) marital status, (xvi) children, (xvii) sports, (xviii) pet information, (xix) type of car, (xx) ethnicity, (xxi) religion, (xxii) ambition, (xxiii) personality, (xxiv) intent, and (xxv) combinations thereof.

5. The computer-based system according to claim 1, wherein all of the user preferences of the first, second, and third system users are lockable so as to require that any locked user preference be met during a matching request.

6. The computer-based system according to claim 1, wherein the first electronic device comprises a graphical user interface, and the one or more servers are further configured to execute computer executable instructions to:

display a photograph of the second system user to the first system user as part of the profile information on the graphical user interface of the first electronic device after determining that at least all locked user preferences of the first system user are met by the second system user and all locked user preferences of the second system user are met by the first system user.

7. The computer-based system according to claim 1, wherein the one or more servers are further operable to:

electronically receive a second matching request, the second matching request electronically submitted by the second system user using a second electronic device; and the one or more servers are further configured to execute computer executable instructions to:

when at least all locked user preferences of the second system user are met by the first system user and all locked user preferences of the first system user are met by the second system user, display profile information regarding the first system user to the second system user so that the second system user is able to initiate communication with the first system user.

8. The computer-based system according to claim 7, wherein the second electronic device comprises a graphical user interface, and the one or more servers are further configured to execute computer executable instructions to:

display a photograph of the first system user to the second system user as part of the profile information on the graphical user interface of the second electronic device after determining that at least all locked user preferences of the second system user are met by the first system user and all locked user preferences of the first system user are met by the second system user.

9. The computer-based system according to claim 7, wherein the second electronic device comprises a graphical user interface, and the one or more servers are further configured to execute computer executable instructions to:

generate an expectations scale on the graphical user interface of the second electronic device so that the second system user is able to select a percentage of non-locked user preferences that are required to be met during a matching request; and the one or more servers are further operable to:

electronically receive the percentage of non-locked user preferences electronically submitted by the second system user using the second electronic device; and in response to receiving the percentage of non-locked user preferences, the one or more servers are further configured to execute computer executable instructions to:

prior to displaying the profile information regarding the first system user to the second system user, further determine whether the percentage of non-locked user preferences of the second system user are met by the first system user and whether the percentage of non-locked user preferences of the first system user are met by the second system user, in addition to all locked user preferences of the second system user being met by the first system user and all locked user preferences of the first system user being met by the second system user;

when the percentage of non-locked user preferences of the second system user additionally are met by the first system user and the percentage of non-locked user preferences of the first system user additionally are met by the second system user, display the profile information regarding the first system user to the second system user so that the second system user is able to initiate communication with the first system user; and when the percentage of non-locked user preferences of the second system user are not met by the first system user and/or the percentage of non-locked user preferences of the first system user are not met by the second system user, do not display profile information regarding the first system user to the second system user.

10. The computer-based system according to claim 1, wherein the one or more servers are further operable to:

electronically receive a third matching request, the third matching request electronically submitted by the third system user using a third electronic device; and the one or more servers are further configured to execute computer executable instructions to:

when all locked user preferences of the third system user are not met by the first system user and/or all locked user preferences of the first system user are not met by the third system user, do not display profile information regarding the first system user to the third system user.

11. The computer-based system according to claim 1, wherein at least one user preference of the first system user that is electronically received by the one or more servers comprises a plurality of locked choices; and the one or more servers are further configured to execute computer executable instructions to:

determine that all locked choices, for the at least one user preference of the first system user comprising the plurality of locked choices, are met by the second system user when at least one of the plurality of locked choices for the at least one user preference of the first system user is met by the second system user.

12. The computer-based system according to claim 1, wherein the one or more servers are further operable to:

electronically receive a fourth matching request, the fourth matching request electronically submitted by the fourth system user using a fourth electronic device; and the one or more servers are further configured to execute computer executable instructions to:

when all locked user preferences of the fourth system user are not met by the first system user, do not display profile information regarding the first system user to the fourth system user even though all locked user preferences of the first system user are met by the fourth system user.

13. A computer-based system for profile matching, the computer-based system comprising:

one or more servers having memory and one or more processing units, the one or more servers being connected to a network, and the one or more servers being operable to:

electronically receive a plurality of user profiles associated with a social networking platform, a first one of the user profiles comprising user preferences of a first system user, a second one of the user profiles comprising user preferences of a second system user, and a third one of the user profiles comprising user preferences of a third system user, at least some of the user preferences of the first, second, and third system users being lockable so as to require that any locked user preference be met during a matching request; and electronically receive a first matching request, the first matching request electronically submitted by the first system user using a first electronic device; and the one or more servers being configured to execute computer executable instructions to:

determine whether all locked user preferences of the first system user are met by the second system user in response to receiving the first matching request;

determine whether all locked user preferences of the second system user are met by the first system user in response to receiving the first matching request;

when at least all locked user preferences of the first system user are met by the second system user and all locked user preferences of the second system user are met by the first system user, display profile information regarding the second system user to the first system user so that the first system user is able to initiate communication with the second system user;

determine whether all locked user preferences of the first system user are met by the third system user in response to receiving the first matching request;

determine whether all locked user preferences of the third system user are met by the first system user in response to receiving the first matching request;

when all locked user preferences of the first system user are not met by the third system user and/or all locked user preferences of the third system user are not met by the first system user, do not display profile information regarding the third system user to the first system user;

determine a quantity of times that a user profile of a particular system user has been changed by the particular system user within a predetermined period of days; and when displaying the profile information regarding the particular system user to another system user, the profile information of the particular system user includes the quantity of times that the user profile has been changed by the particular system user within the predetermined period of days so as to assist the other system user in determining whether to communicate with the particular system user.

14. A computer-based system for profile matching, the computer-based system comprising:

one or more servers having memory and one or more processing units, the one or more servers being connected to a network, and the one or more servers being operable to:

electronically receive a plurality of user profiles associated with a social networking platform, a first one of the user profiles comprising user preferences of a first system user, a second one of the user profiles comprising user preferences of a second system user, and a third one of the user profiles comprising user preferences of a third system user, at least some of the user preferences of the first, second, and third system users being lockable so as to require that any locked user preference be met during a matching request; and electronically receive a first matching request, the first matching request electronically submitted by the first system user using a first electronic device; and the one or more servers being configured to execute computer executable instructions to:

determine whether all locked user preferences of the first system user are met by the second system user in response to receiving the first matching request;

determine whether all locked user preferences of the second system user are met by the first system user in response to receiving the first matching request;

when at least all locked user preferences of the first system user are met by the second system user and all locked user preferences of the second system user are met by the first system user, display profile information regarding the second system user to the first system user so that the first system user is able to initiate communication with the second system user;

determine whether all locked user preferences of the first system user are met by the third system user in response to receiving the first matching request;

determine whether all locked user preferences of the third system user are met by the first system user in response to receiving the first matching request;

when all locked user preferences of the first system user are not met by the third system user and/or all locked user preferences of the third system user are not met by the first system user, do not display profile information regarding the third system user to the first system user;

determine a quantity of times that one or more user preferences of a particular system user have been changed by the particular system user within a predetermined period of days; and when displaying the profile information regarding the particular system user to another system user, the profile information of the particular system user includes the quantity of times that the one or more user preferences have been changed by the particular system user within the predetermined period of days so as to assist the other system user in determining whether to communicate with the particular system user.

\* \* \* \* \*